United States Patent
Tao et al.

(10) Patent No.: US 8,175,035 B2
(45) Date of Patent: May 8, 2012

(54) DYNAMIC FRACTIONAL FREQUENCY REUSE IN OFDMA NETWORKS

(75) Inventors: Zhifeng Tao, Allston, MA (US); Jinyun Zhang, Cambridge, MA (US); Weihuang Fu, Cincinnati, OH (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 859 days.

(21) Appl. No.: 12/263,236

(22) Filed: Oct. 31, 2008

(65) Prior Publication Data

US 2010/0110996 A1    May 6, 2010

(51) Int. Cl.
*H04W 4/00* (2009.01)

(52) U.S. Cl. ......... 370/328; 370/343; 370/468; 370/480

(58) Field of Classification Search .................. None
See application file for complete search history.

(56) References Cited

U.S. PATENT DOCUMENTS

| | | | |
|---|---|---|---|
| 8,095,134 B2* | 1/2012 | Huang et al. ............... | 455/436 |
| 2007/0177501 A1* | 8/2007 | Papasakellariou ......... | 370/229 |
| 2010/0061469 A1* | 3/2010 | Tao et al. .................. | 375/260 |
| 2010/0208687 A1* | 8/2010 | Lim et al. .................. | 370/329 |

* cited by examiner

*Primary Examiner* — Kevin C Harper
(74) *Attorney, Agent, or Firm* — Dirk Brinkman; Gene Vinokur

(57) ABSTRACT

A method allocates resources in an orthogonal frequency-division multiple access (OFDMA) network including a set of base stations (BSs), and a set of mobile stations (MSs) for each BS. Each cell includes a center and edge zone. A node weighted constraint graph is constructed for the network. Maximal independent sets in the graph are searched as sub-channels are allocated to the MSs in edge zones. Remaining bandwidth is allocated to the MSs in the center zones. Power is assigned to the sub-channels so that inter-cell interference is minimized and traffic load is maximized.

14 Claims, 19 Drawing Sheets

DYNAMIC FRACTIONAL FREQUENCY REUSE IN OFDMA NETWORKS

FIELD OF THE INVENTION

This invention related generally to allocating resources in wireless networks, and more particularly to allocating bandwidth in orthogonal frequency division multiple access (OFDMA) cellular networks.

BACKGROUND OF THE INVENTION

OFDMA

Orthogonal frequency-division multiplexing (OFDM) is a modulation technique used at the physical layer (PHY) of a number of wireless networks, e.g., networks designed according to the well-known IEEE 802.11a/g and IEEE 802.16/16e standards. Orthogonal frequency-division multiple access (OFDMA) is a multiple access scheme based on OFDM. In OFDMA, separate sets of orthogonal sub-channels ("tones"), and time slots are allocated to mobile stations (MSs) so that the MSs can communicate concurrently. OFDMA is widely adopted in many next generation cellular systems such as 3GPP Long Term Evolution (LTE) and IEEE 802.16m due to its effectiveness and flexibility in bandwidth allocation.

OFDMA Bandwidth Allocation

The radio frequency (RF) spectrum (bandwidth) is a scarce resource in wireless communications. Therefore, an efficient use of the bandwidth is needed. The rapid growth of wireless applications and subscriber mobile states, e.g., mobile telephones, have called for a good radio resource management (RRM) scheme that can increase the network capacity and, from a commercial point of view, save deployment cost. Consequently, developing an effective bandwidth allocation scheme for OFDMA is of significant interest for industry.

Effective bandwidth allocation has to consider the limited radio spectrum, the vast area to be covered, and large number of MSs. In other words, the same bandwidth channels must be reused in multiple geographical areas or cells. Typically, the bandwidth is allocated in a coordinated manner by base stations at the approximate centers of the cells using some infrastructure. This will inevitably incur inter-cell interference (ICI) when MSs in adjacent cells use the same spectrum. ICI is the predominant performance-limiting factor for wireless cellular networks.

Fractional Frequency Reuse

Fractional frequency reuse (FFR) is one techniques to achieve a balance between spectral efficiency and interference reduction. FFR partitions a cell into a center zone near the base station and an edge zone at the periphery of the cell. FFR allocates frequency sub-channels to MSs in the zones with different frequency reuse factors and transmit power levels. When the MS is in the edge zone, the MS is more likely to experience ICI than when the MS is in the center zone.

The sub-channels allocated to the MSs in the edge zone are called the edge sub-band and the sub-channels allocated to the MSs in the center zone are called the center sub-band.

FFR can be categorized as hard FFR or soft FFR. Hard FFR partitions the frequency band into the edge sub-band and the center sub-band. The edge sub-bands have a high frequency reuse factor, e.g., three, and the center sub-band has a frequency reuse factor of one. In other words, the sub-bands for adjacent edge zones are disjoint, while the sub-bands for the center zones of adjacent cells can be the same. To reduce the interference among the MSs in the center zones, the transmit power is usually less than the transmit power used for the edge sub-band.

In soft FFR, the MSs in the center zone reuses the frequency resource used by adjacent edge zones. To reduce possible interference to adjacent edge sub-bands, soft FFR uses a transmit power that is less than the power for the center sub-band that is not used for MSs in any cell edge zones. Soft FFR can be further partitioned into soft FFR A and soft FFR B, depending if there is a dedicated center sub-band or not. In the prior art, allocated bandwidth under FFR is fixed for a particular network.

There is a need for a dynamic FFR that can adapt to a changing network environment. For example, new cells may be installed or existing cells can be disabled temporarily or permanently. The traffic loads in cells can vary over time. The traffic load depends on the number of MSs and the amount of data that are communicated in a cell. Relay stations (RSs) may also be present in cells. Fixed FFR schemes with predetermined resource allocation cannot meet such requirements.

Conventional FFR schemes require that any adjustment to bandwidth resources is the same for edge or center zones. All edge zones reusing the same frequency resource have to be extended or reduced by unit(s) of frequency resource at the same time. Similarly, all cells have to extend or reduce, if applicable, the center sub-band at the same time. Therefore, the cells using the same edge sub-bands have to have same allocation adjustment. Such mechanism is not able to satisfy the needs in case where different cells have different needs.

SUMMARY OF THE INVENTION

The embodiments of the invention provide a method for allocating bandwidth in an orthogonal frequency division multiple access (OFDMA) network using sub-channel "stealing." In sub-channel stealing, sub-channels are allocated to cell edge zones by considering the traffic loads and interference reduction, and a cell is able to utilize the sub-channel residual capacity, i.e., unallocated sub-channels, from adjacent cells to increase the center zone throughput.

This method differs from the prior art resource FFR allocation in four fundamental aspects.

Firstly, the allocated bandwidth for edge sub-channels and center sub-channels can vary for different cells. Conventional FFR allocation schemes require that all cells, within a specified reuse distance and the same sub-bands, have same sub-channel allocations.

Secondly, a base station can optimally adjust the transmit powers of the allocated center sub-channels to increase throughput of stations in the center zone while satisfy interference constraints to stations in adjacent edge zones.

Thirdly, the allocation of edge sub-channels is adaptive to the traffic load at each base station. The conventional FFR sub-channel allocation cannot be adaptive to the traffic load changes because the same sub-bands must have the same sub-channel allocations throughout the network.

Fourthly, there are two bounds set by each base station for bandwidth reservations for the edge zone and the center zone, respectively, where the lower bound reserves the bandwidth for the edge zone and the upper bound reserves bandwidth for the center zone by constraining the edge zone throughput. The bounds can be adjusted as needed. Each base station is able to reserve certain sub-channels for edge zone and center zone usage, which prevents a cell having not enough sub-channels to support the traffic load.

The method constructs a node weighted constraint graph to model a topology and traffic load of the network. Sub-channels are allocated by iteratively searching maximal independent sets of nodes in the graph. Then, transmit power levels are assigned to the allocated sub-channels.

In the graph, nodes represent base stations and edges represent allocation constraints between two adjacent base stations, e.g., sub-channel allocations for adjacent edge zones must be disjoint. The method can be performed by a specified network entity, e.g., a designed base station, an infrastructure of the network, or combinations thereof.

The search of the maximal independent sets is performed iteratively on the graph. During each iteration, available sub-channels are allocated to the nodes in the independent set. The weights of the nodes in the independent set are updated after allocating the sub-channels.

For the nodes whose weights are non-positive, (w<0), and the amount of the allocated sub-channels is greater than the edge sub-band lower bound ($B_e^L$), the nodes and corresponding edges are removed from the graph. This operation is also performed for the other case that the nodes where the amount of the allocated sub-channels is more than the edge sub-band upper bound ($B_e^U$) if the weights are positive.

The iteration continues until the graph is empty or all of the available bandwidth is allocated. After the appropriate sub-channel allocation has been determined, the information can be distributed to the base stations, and hence the mobile stations.

The center sub-band of each base station is determined by the complementary set of all sub-channels allocated to the edge sub-band. That is, any unallocated sub-channels are reserved for the center sub-band. By examining the usage of sub-channels of the adjacent base stations (adjacent nodes in the graph from the first step), the transmit powers can be assigned.

The graph can be updating dynamically over time as needed to adapt to traffic load and network topology, e.g., the location of the stations. The above steps can then be repeated.

DETAILED DESCRIPTION OF THE PREFERRED EMBODIMENT

OFDMA Sub-channel Allocation

Figure 1:
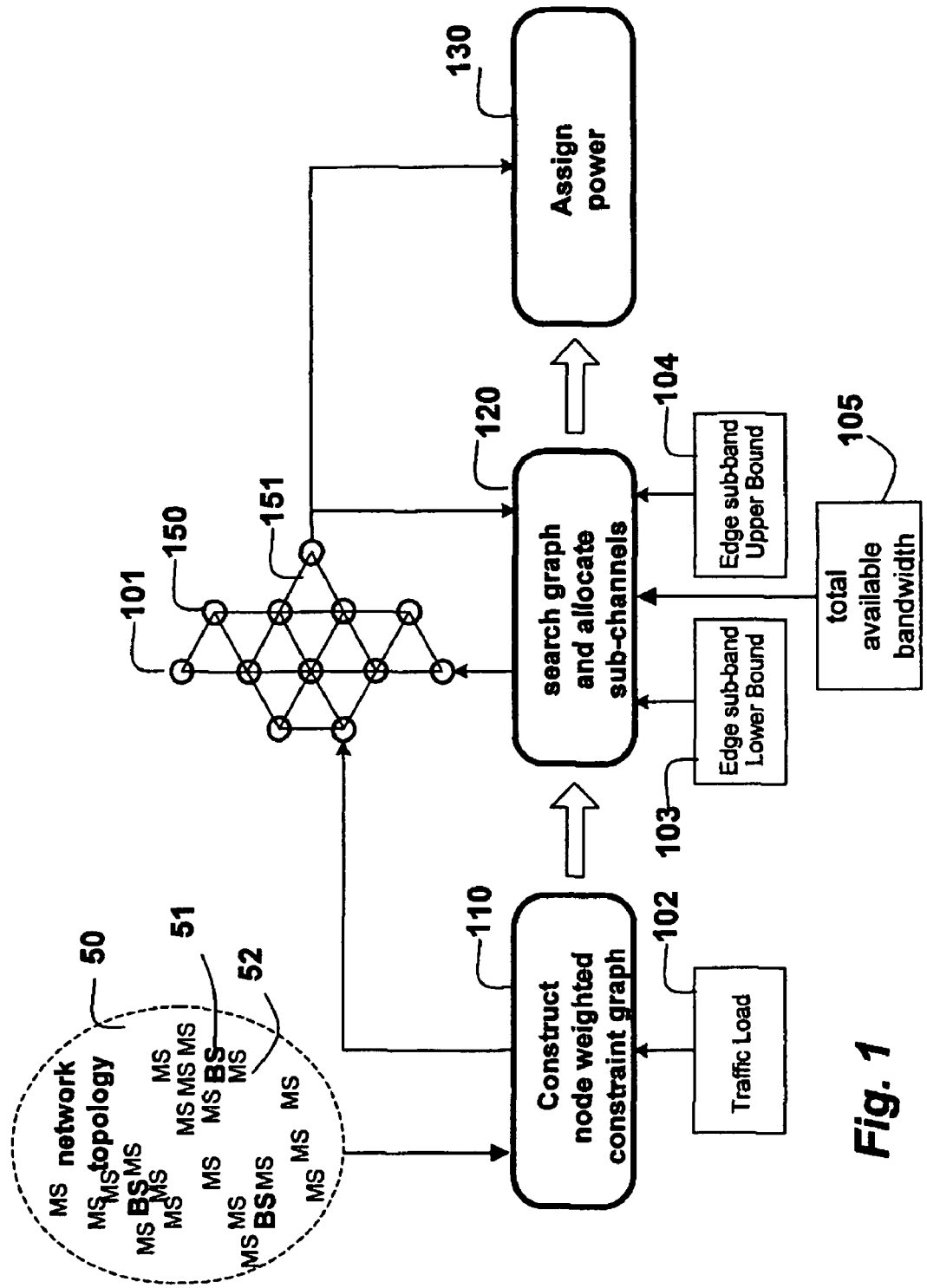
FIG. 1 is a flow chart of a method for allocating resources in an OFDMA network according to the embodiments of the invention.

FIG. 1 shows a method for allocating resources in an orthogonal frequency-division multiplexing access (OFDMA) network 50 according to embodiments of our invention.

The OFDMA network includes multiple base stations (BSs) 51 and a set of mobile stations (MSs) 52 for each BS. Each BS serves the set of MSs in its cell. The cell can be partitioned into a center zone near the BS, and an edge zone at the periphery of the cell, see FIG. 2A. It is an object of the invention to minimize inter-cell interference (ICI), particularly interference at MSs in edge zones in adjacent cells.

The network has a total available bandwidth, which is usually determined by a regulatory agency, e.g., the FCC. The bandwidth can be partitioned in sub-band, and the sub-bands into sub-channels. The size of the sub-bands and number of sub-channels can vary from network to network. Typically, sub-bands are allocated to base stations or zones, and sub-channels to the MSs (subscribing users) in the zones.

Graph Construction

Figure 2A:
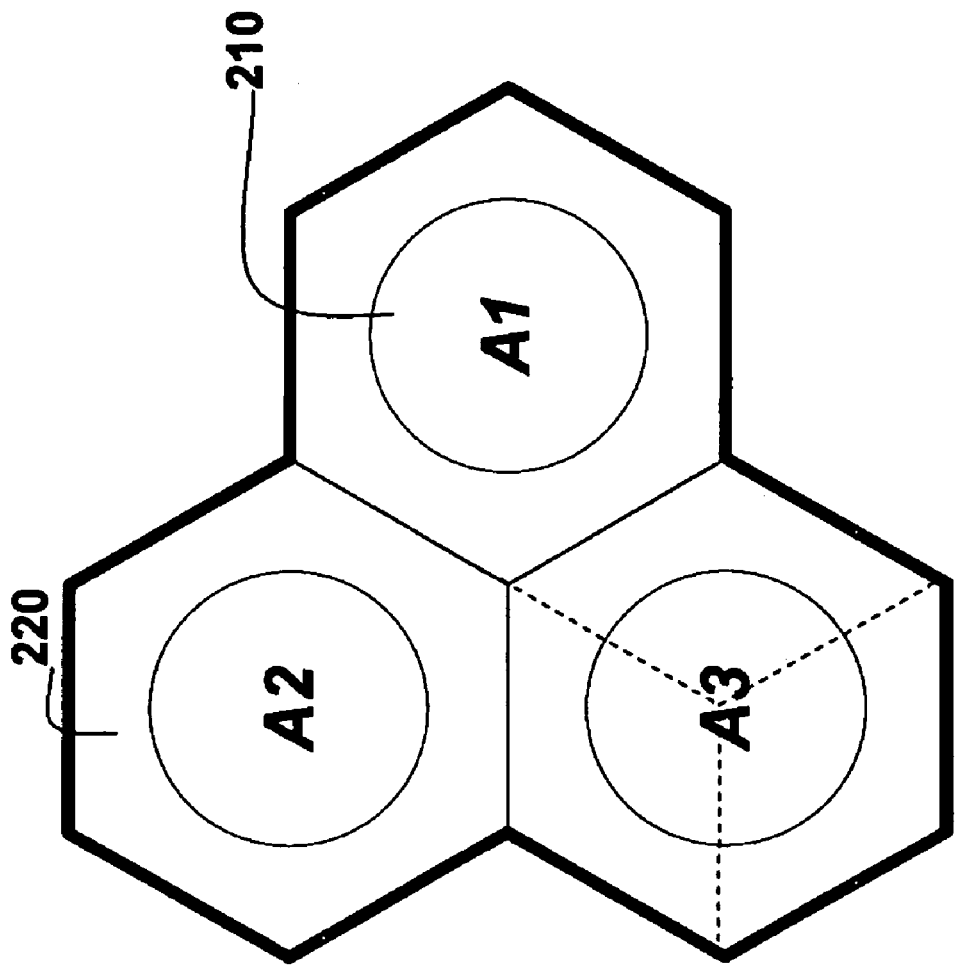
FIG. 2A is a schematic of a network of cells including center and edge zones according to embodiments of the invention.

We construct 110 a graph 101 to model the OFDMA network 50. In the graph, nodes 150 represent the base stations. Edges 151 connecting pairs of nodes represent the sub-channel allocation constraints of the base stations, e.g., the connected nodes have adjacent edge zones. The example graph is shown for entire cells. However, the graph can also model sectors of cells. FIG. 2A shows cell 3A with three sectors. The structure of the graph depends on the network topology, i.e., the locations of the base stations for interference estimation.

The nodes in the graph are weighted according to the traffic loads. The traffic load in the edge zones is of special interest. The traffic loads can depend on the number of MSs and the amount of data communicated by the MSs.

Hence the graph is a node weighted constraint graph.

Sub-Channel Allocation

An iteratively maximal independent set search 120 is performed on the graph 101. As defined herein, the maximal independent set is an independent set that is not a subset of any other independent subset, where independent set is a subset of nodes in the graph such that no two nodes in the subset are adjacent in the graph. That is, any nodes in the independent set do not have any edges connecting the nodes in the set. During the search, we allocate resources to the nodes so that inter-cell interference (ICI) is minimized.

The weights of the nodes in each independent set are updated by subtracting a bandwidth value of the allocated sub-channels from the total available bandwidth 105. The graph is updated by taking into account the updated node weights, edge sub-band lower bound 103, and edge sub-band upper bound 104.

The nodes with non-positive weights, whose amount of the allocated sub-channels is more than the edge sub-band lower bound, are removed from the graph. The corresponding edges are also removed. At the same time, the nodes whose amount of the allocated edge sub-channels is more than the edge sub-band upper bound are removed from the graph. The iterations complete when the graph is empty or all of the available bandwidth has been allocated.

The center sub-band of a node takes the complementary set in all sub-channels of its allocated edge sub-band. In other words, this means that any sub-channels not allocated to the edge-band are reserved for allocation to the center-band.

Power Assignment

To determine 130 the transmit power for the sub-band of the center zone of a particular cell, the sub-channel allocation for the edge-zones in adjacent cells is examined. A particular node (base station) can determine the transmit power to use for the sub-channels in the complementary set. If the sub-channel is not allocated to any adjacent edge zones, then the sub-channels in the center zone use power $P_{c1}$. Otherwise, the sub-channels uses power $P_{c2}$, where $P_{c1}$ is greater than $P_{c2}$.

Bandwidth Allocation

FIG. 2A shows an example network with three cells A1, A2, and A3. The MSs in each cell can be located in either the center zone 210 or the edge zone 220. The center zone is nearest the base station, while the edge zone is nearest the periphery of the cell.

Figure 2B:
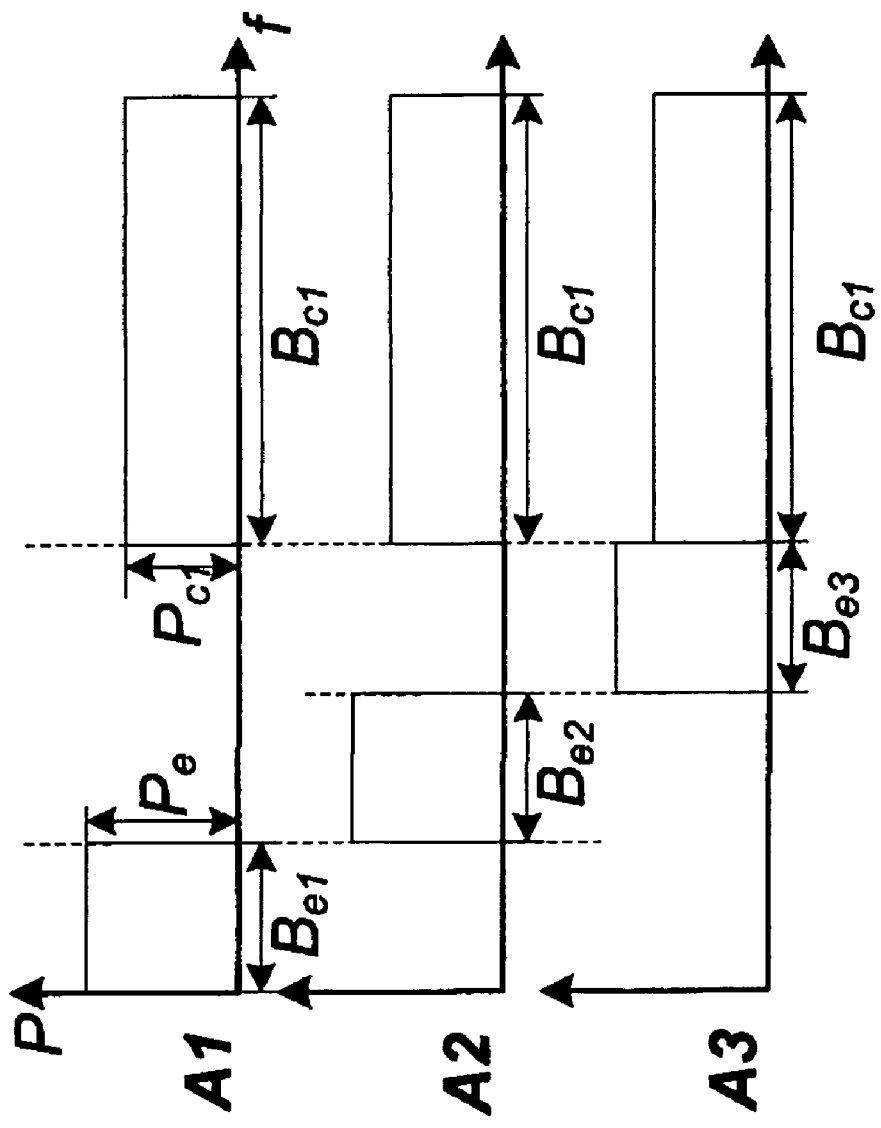
FIG. 2B is a diagram of resource allocation according to hard fractional frequency reuse (FRR) according to embodiments of the invention.
Figure 2C:
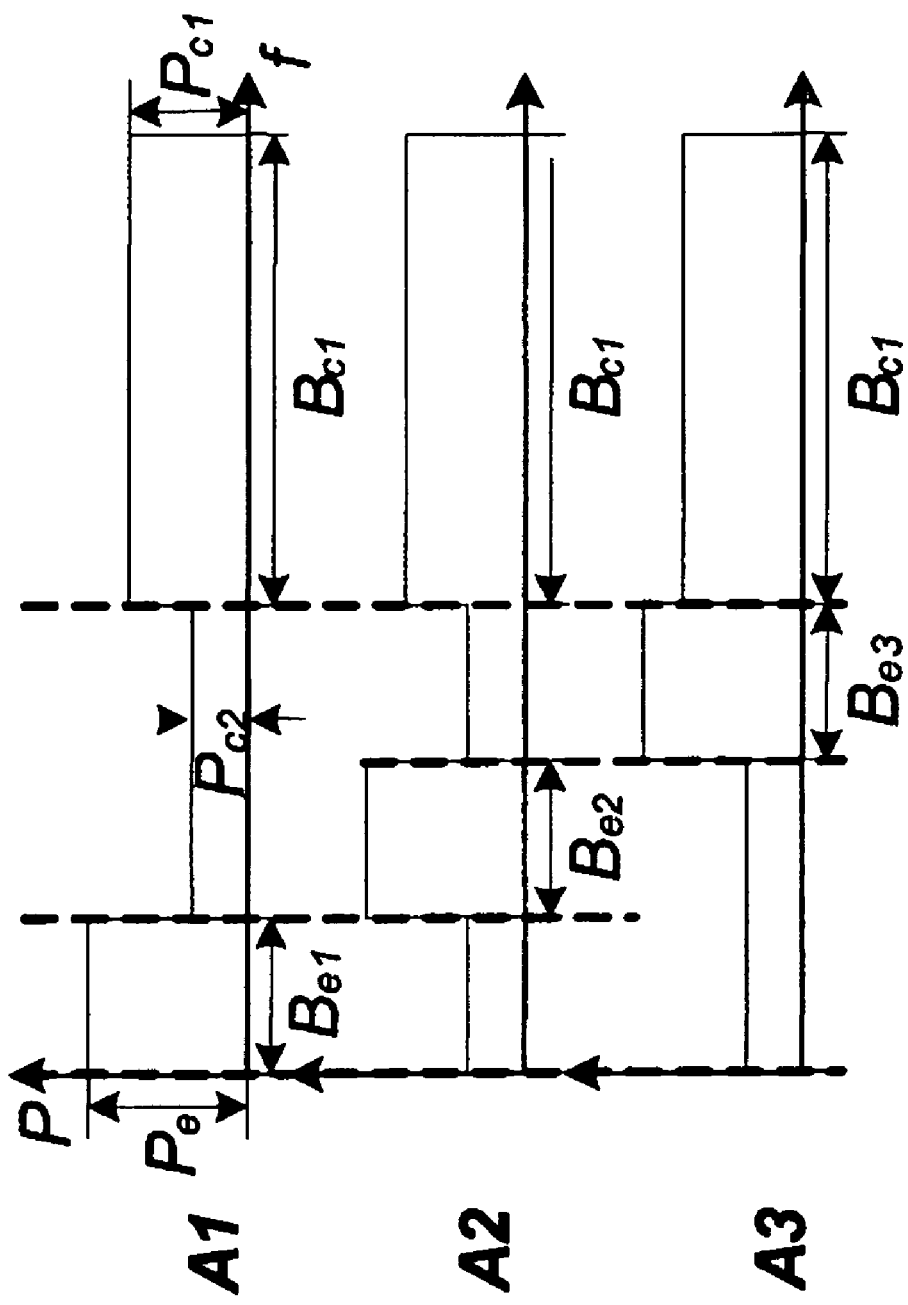
FIG. 2C is a diagram of resource allocation according to soft FFR-A according to embodiments of the invention.
Figure 2D:
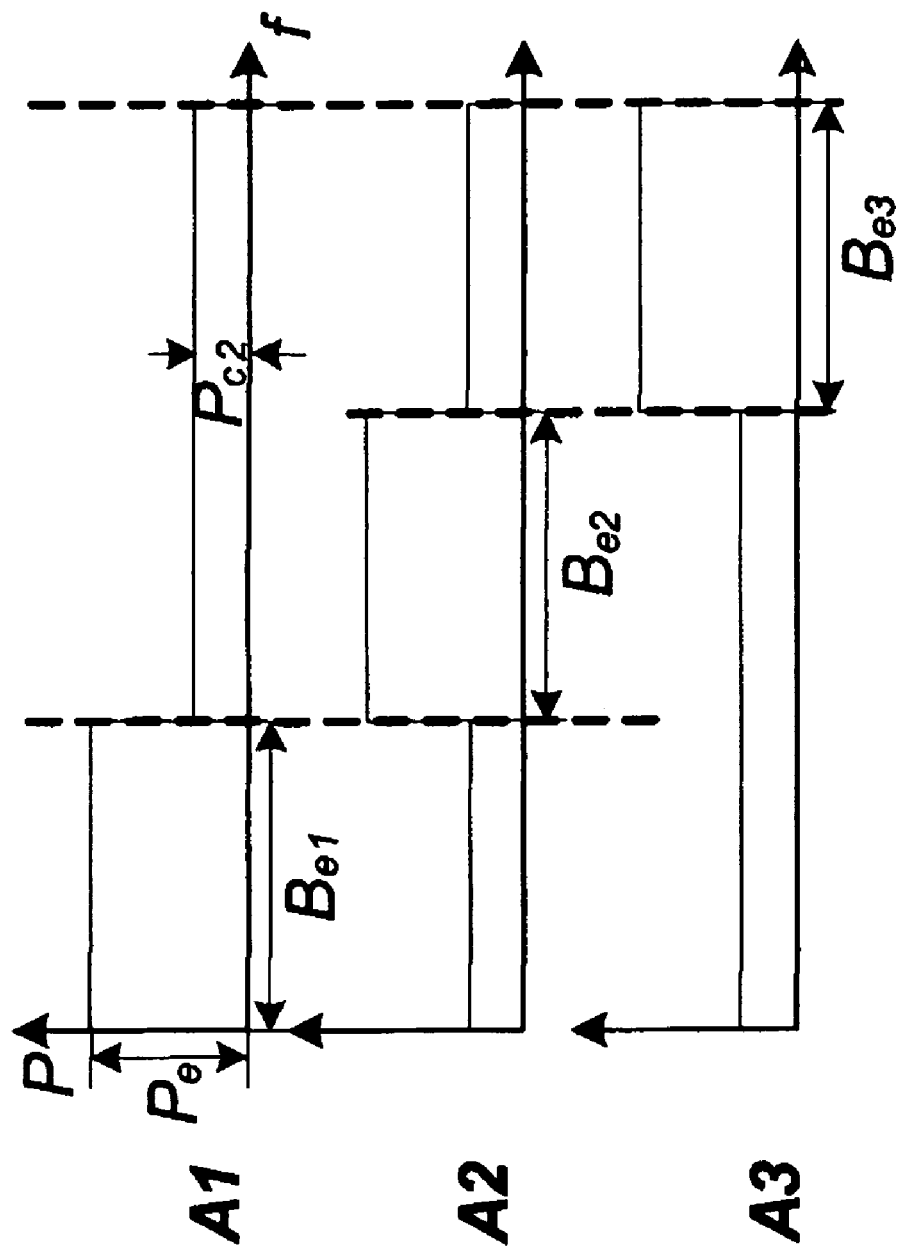
FIG. 2D is a diagram of resource allocation according to soft FFR-B according to embodiments of the invention.

FIGS. 2B-2D show an example bandwidth allocations (horizontal axis f=frequency) and power assignments (vertical axis P=transmit power) according embodiments of the invention using fractional frequency reuse (FFR). Three versions of FFR are shown: hard FFR, soft FFR A, and soft FFR B.

FIG. 2B shows hard FFR. With hard FFR, the MSs in the center zones 210 share the same bandwidth ($B_{c1}$), i.e., the MSs are allocated the same sub-channels selected from the sub-band for the cell. The MSs in the edge zones of adjacent cells are allocated disjoint sub-bands ($B_{e1}$, $B_{e2}$, and $B_{e3}$). Some of the bandwidth available for each cell is unallocated to satisfy edge sub-channel allocation constraints. The sub-channels allocated for the edge zones are assigned power $P_e$, which is higher than power $P_{c1}$ assigned to the sub-channels allocated for the center zones.

FIG. 2C shows soft FFR A. With soft FFR A, the unallocated bandwidth is allocated to MSs in the center zone but at a low power $P_{c2}$ assignment. This has a better usage for the center bandwidth resource allocation but may increase interference between the MSs in the center zone and MSs in edge zones of adjacent cells.

FIG. 2D shows soft FFR B. With soft FFR B, the allocated center sub-bands are assigned the lower power $P_{c2}$. The total bandwidth is available for allocation MSs in edge zones at power $P_e$. As a result, the center sub-channels can overlap with the sub-bands in adjacent edge zones.

Adaptive Sub-Channel Allocation and Reservation

Figure 3:
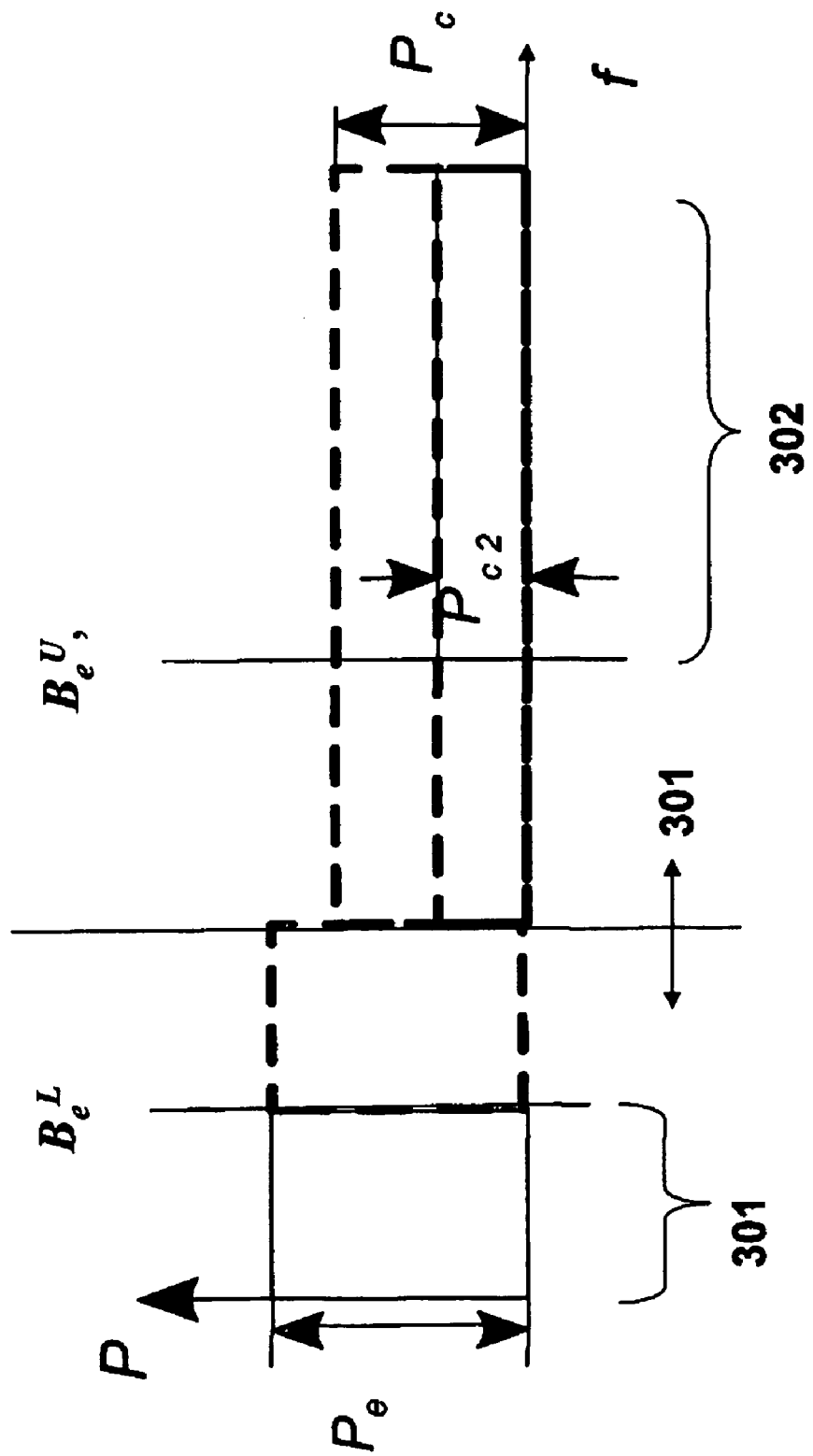
FIG. 3 is a diagram of resource allocation according to embodiments of the invention.

FIG. 3 shows adaptive sub-channel allocation and transmit power assignment. Edge zone sub-channels 301 and center zone sub-channels 302 can be reserved. Between the edge sub-band lower bound $B_e^L$, and the edge sub-band upper bound $B_e^U$, allocation of the sub-channels is adaptive 310 to the traffic load in the edge zone, as indicated by line 310.

Each base station is able to adjust the lower and upper bounds to affect the overall throughput, edge throughput, and center throughput. The figure shows the minimum edge 301 sub-channel allocation and transmit power assignment $P_e$, and the minimum center 302 sub-channel and transmit power assignment $P_{c1}$. The allocation of sub-channels is adaptive 301 to the traffic load. The center sub-channel power level selection ($P_{c1}$ or $P_{c2}$) is performed by step 130 in FIG. 1.

An Example Network

Figure 4:
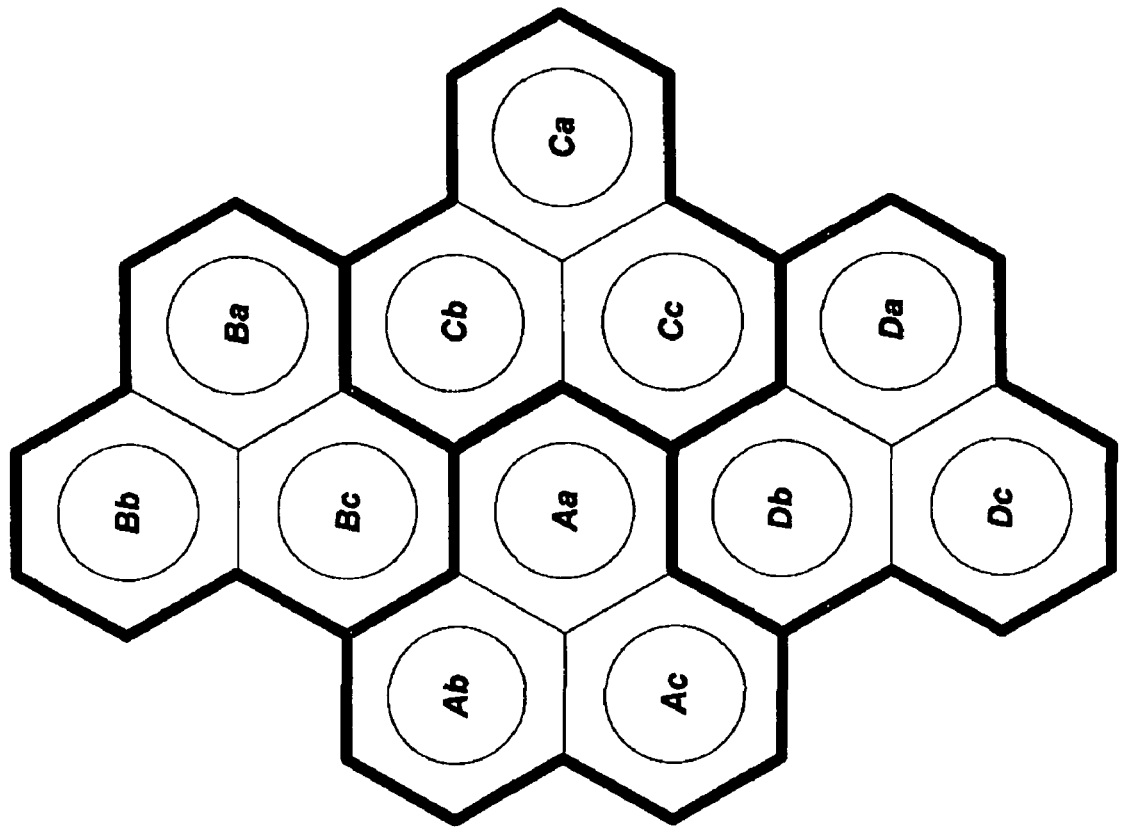
FIG. 4 is a schematic of a multi-cell network according to the embodiments of the invention.

FIG. 4 shows an example of a network including four clusters (heavy lines A, B, C, and D), where each cluster includes three cells (light lines a, b, and c). The available sub-band includes twelve sub-channels (1-12).

Figure 5A:
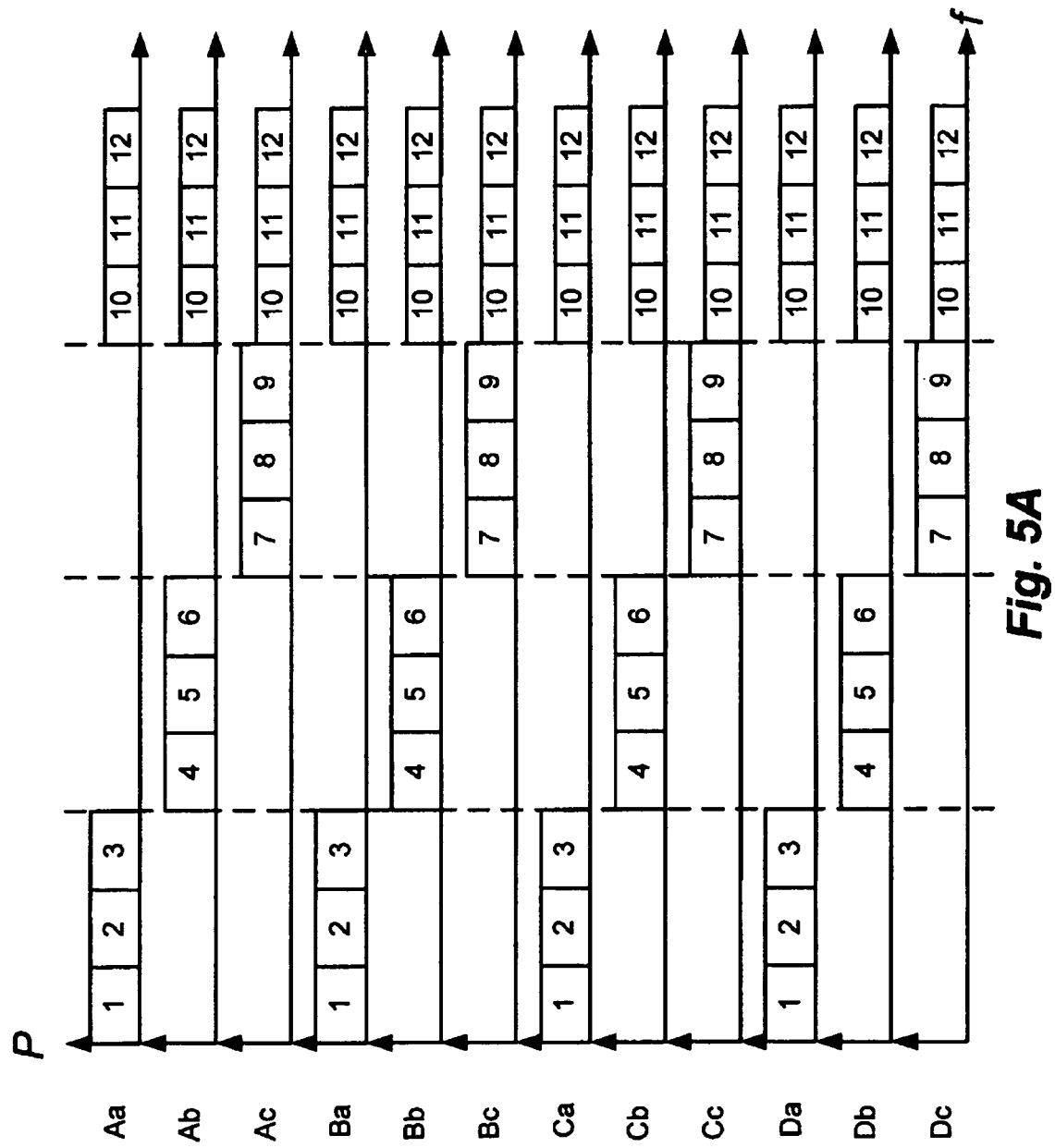
FIGS. 5A-5C are schematics of allocations of hard FFR, soft FFR A, and soft FFR B, respectively for the network of FIG. 4.
Figure 5B:
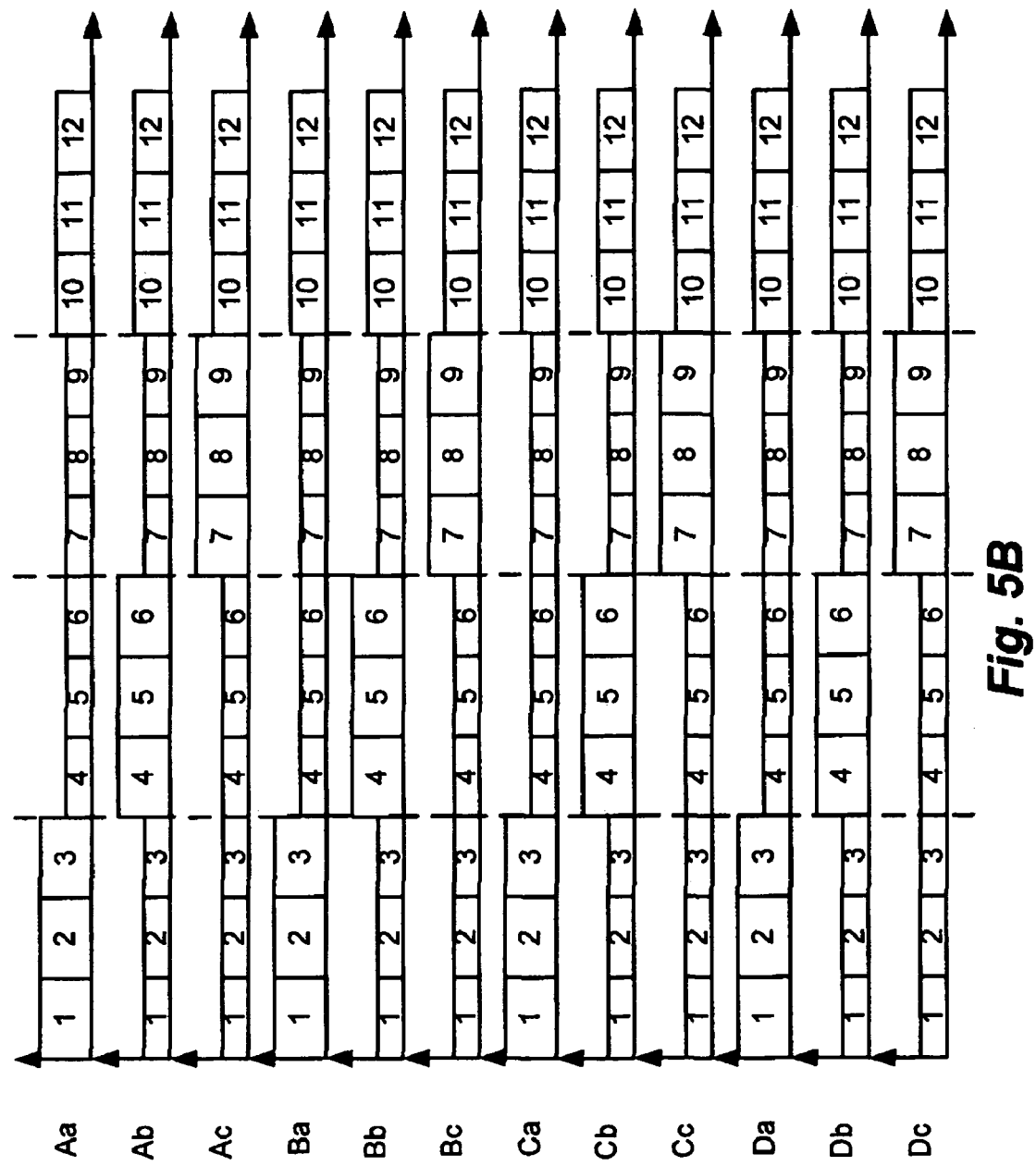
Figure 5C:
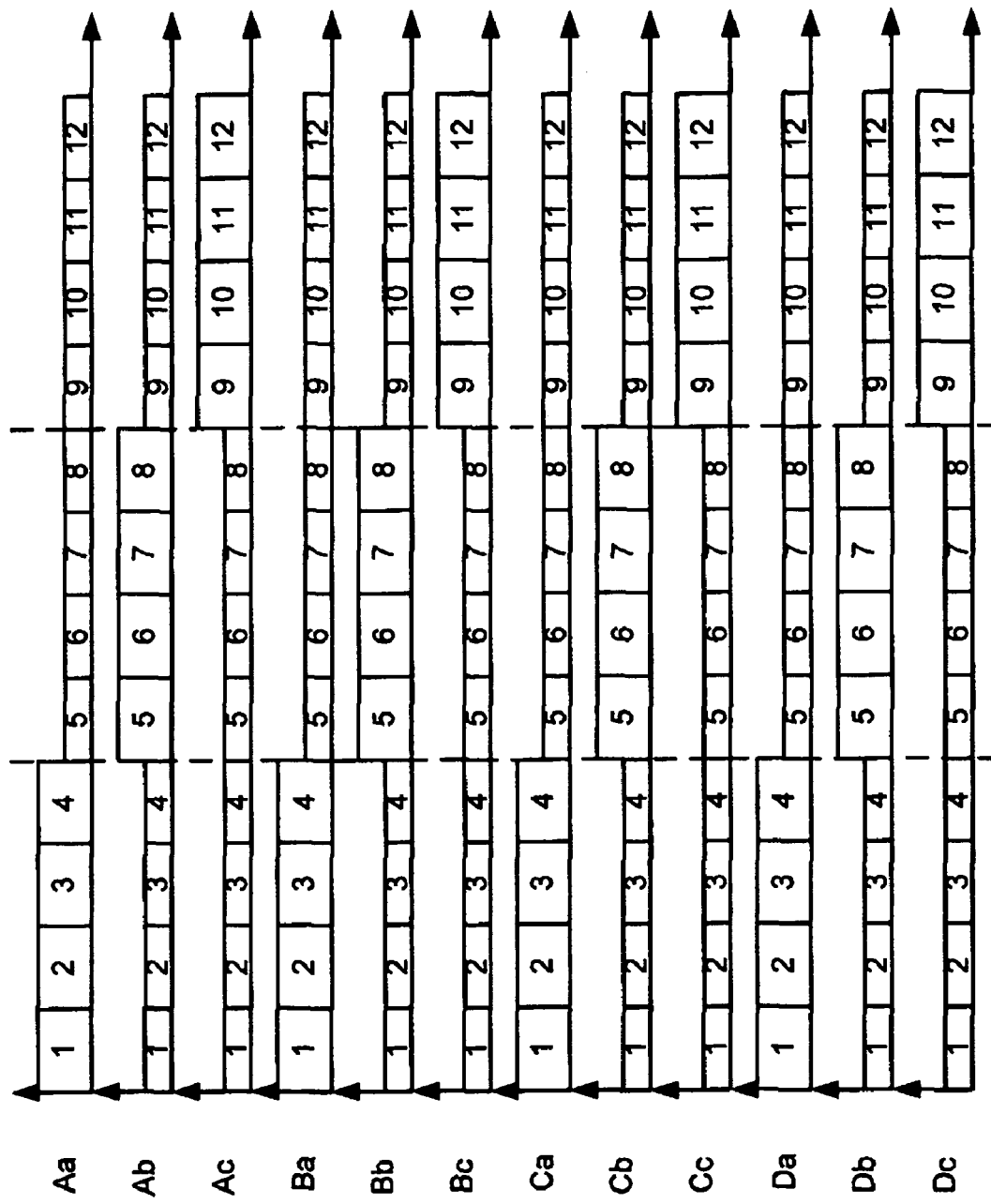

FIGS. 5A-5C shows one example of sub-channel (1-12) allocations and power assignment for hard FFR, soft FFR A, and soft FFR B, respectively. The horizontal axis indicates bandwidth allocations f, and the vertical axis relative transmit power assignments P.

In FIG. 5A, hard FFR allocates sub-channels 1-9 for MSs in edge zones for a frequency reuse factor of three, and 10-12 to MSs in center zones for a frequency reuse factor of one. Sub-channels 1-9 in the center zones have a greater transmit power than sub-channels 10-12 in the edge zones. The allocated sub-channels are aligned as denoted by the dashed lines, which means adjacent cells use different sub-channel for the edge zones.

In FIG. 5B, soft FFR A allocates the same sub-channels for the edge zones and the same sub-channels for the center zones as in hard FFR. Soft FFR A also allocates the sub-channels used by adjacent edge zones to the center zone. The transmit power of these sub-channels are lower than the transmit power used in by the center zone. This way more sub-channels are allocated to the center zones.

In FIG. 5C, soft FFR B allocates dedicated sub-channels to the center zones, e.g., 1-4, 5-8, and 9-12 to edge zones. Sub-channels not allocated to edge zones are also allocated to the center zones.

In conventional FRR, the allocations do not change, which makes it impossible to adapt dynamically to network changes, such as network topology 10 and traffic load 102.

Figure 6A:
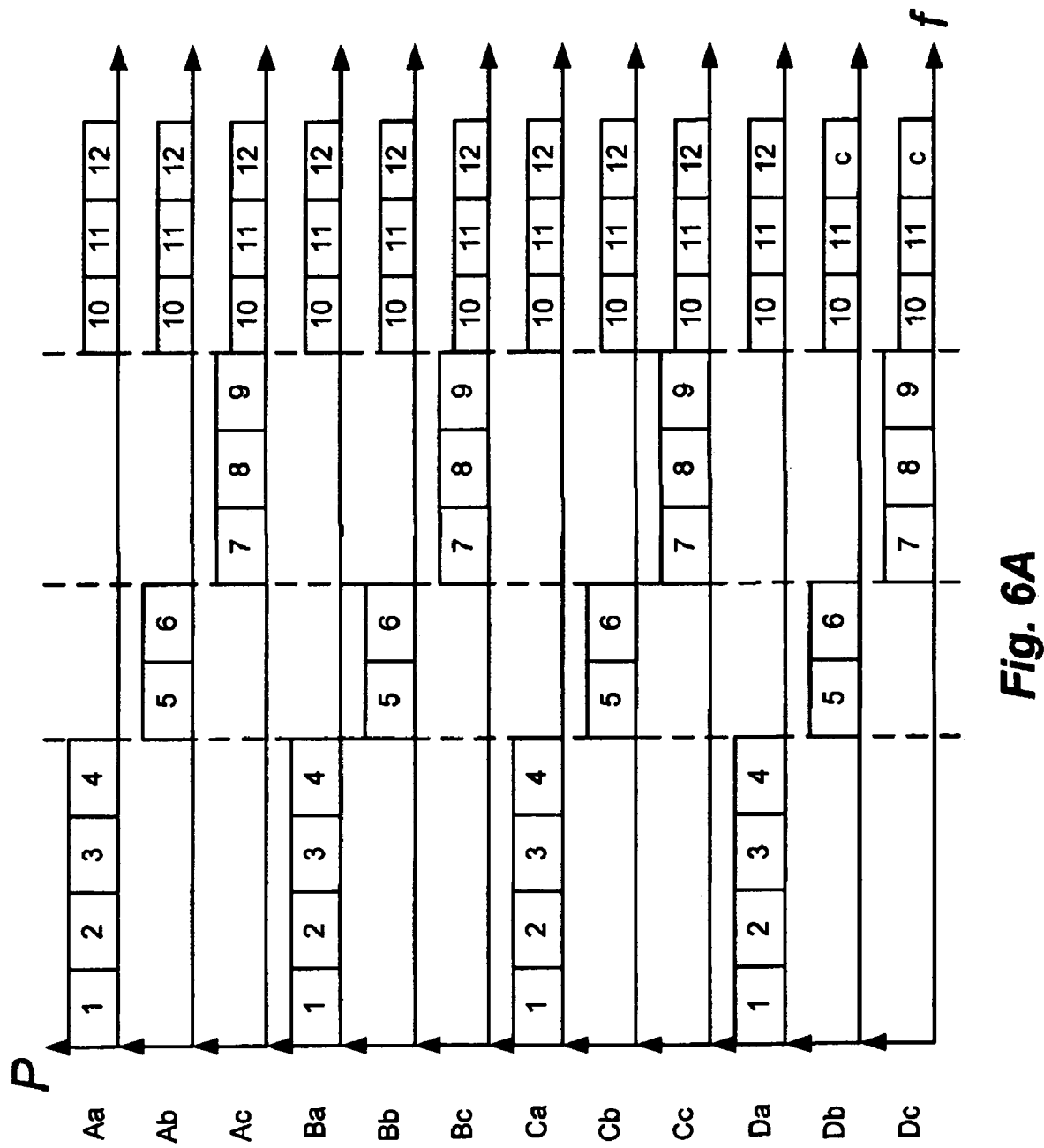
FIGS. 6A-6C are schematics of allocation adjustments of hard FFR, soft FFR A, and soft FFR B to extend the edge sub-band for the network of FIG. 4.
Figure 6B:
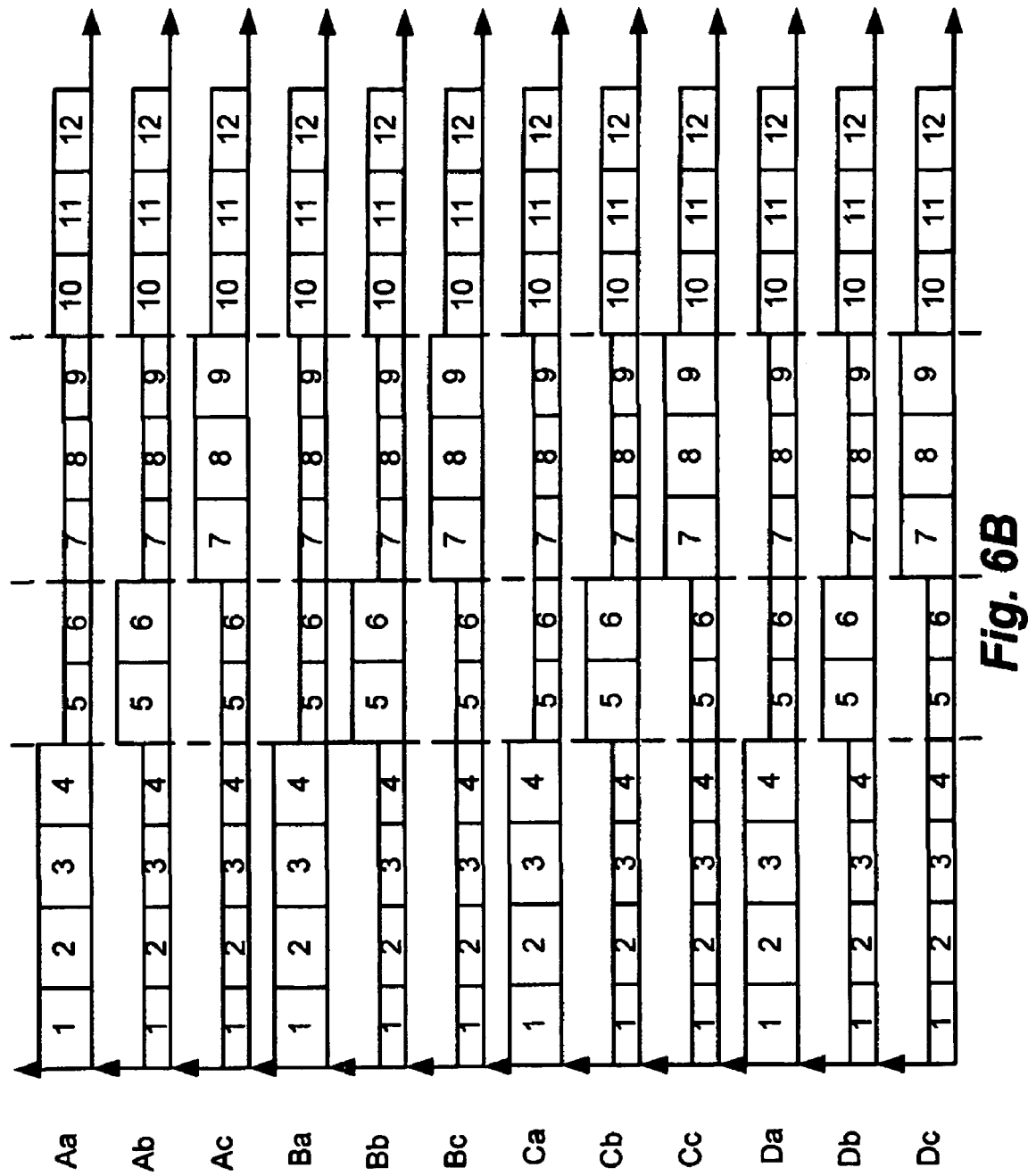
Figure 6C:
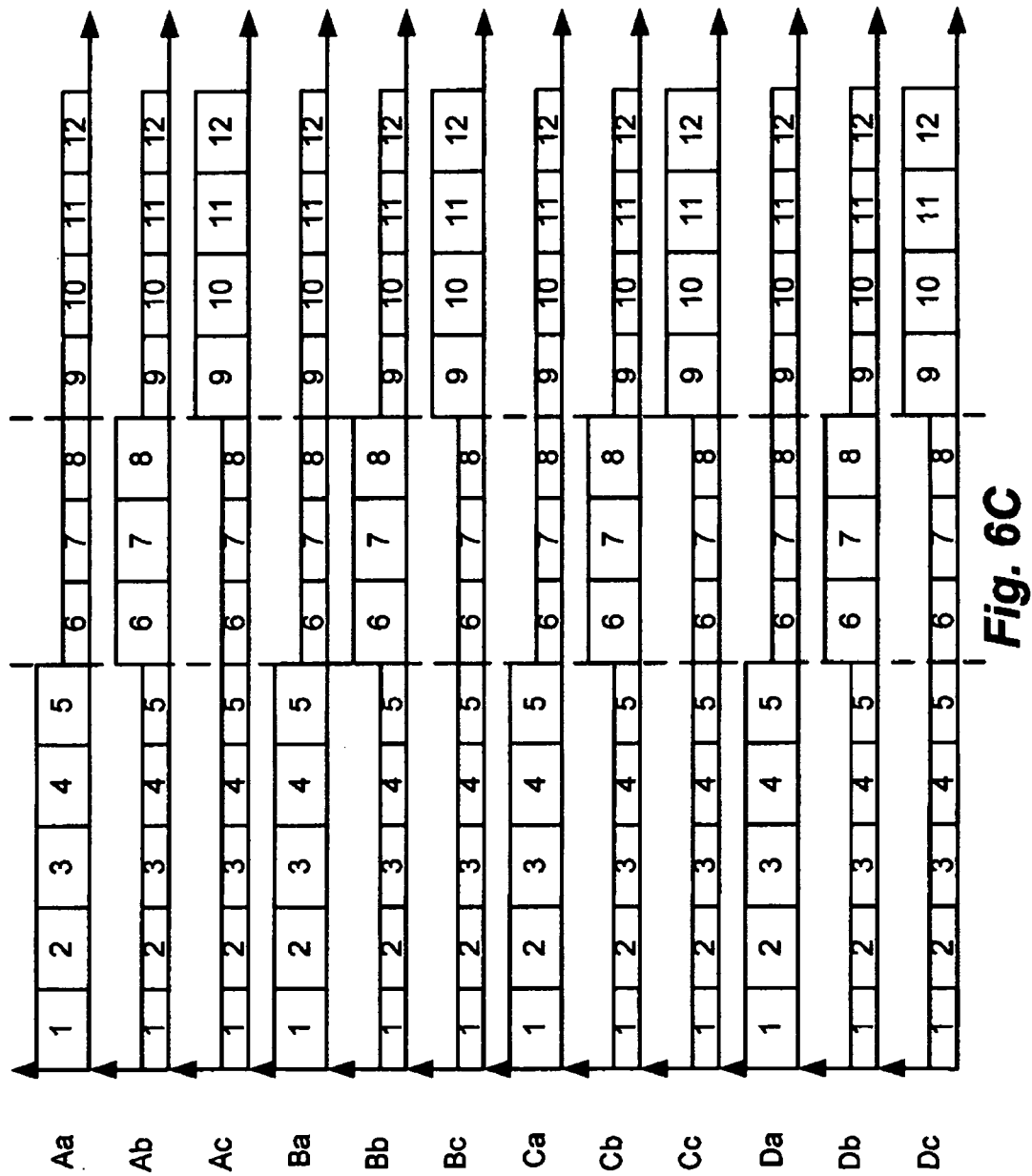

FIGS. 6A-6C respectively show the allocations to extend the edge sub-band, corresponding to FIGS. 5A-5C.

Figure 7A:
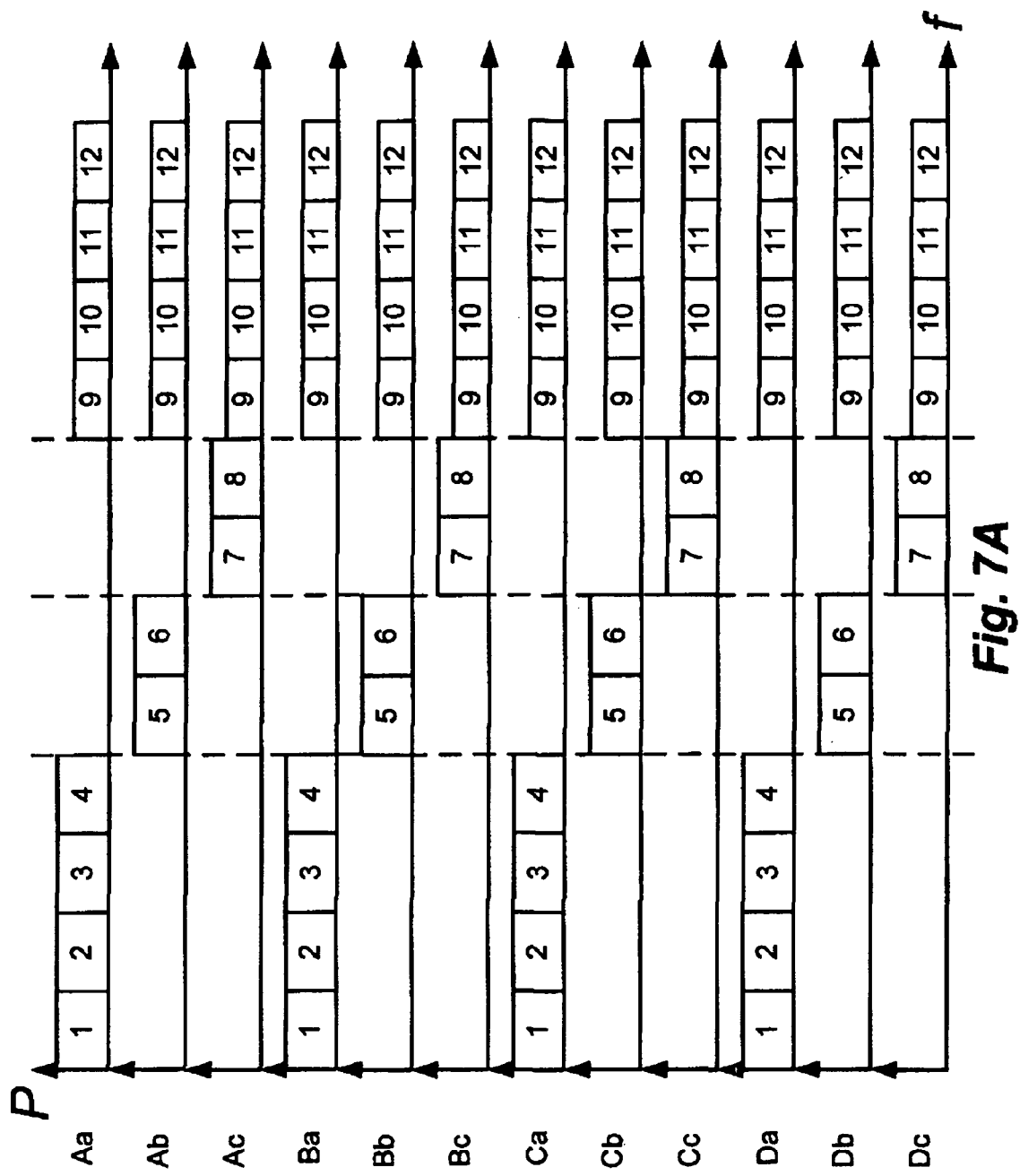
FIGS. 7A-7C are schematics of the allocation adjustments of hard FFR, soft FFR A, and soft FFR B to extend the center sub-band for the network of FIG. 4.
Figure 7B:
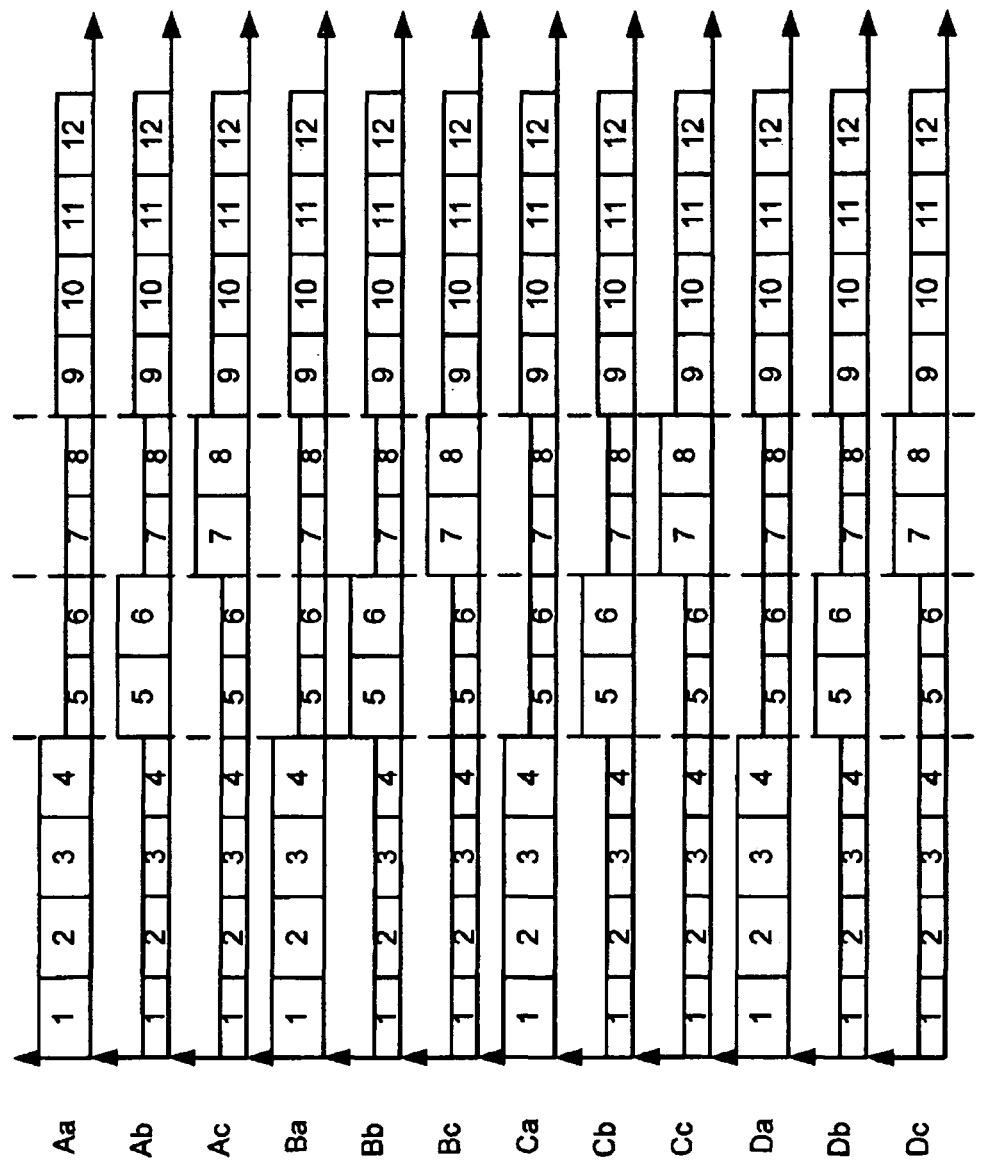
Figure 7C:
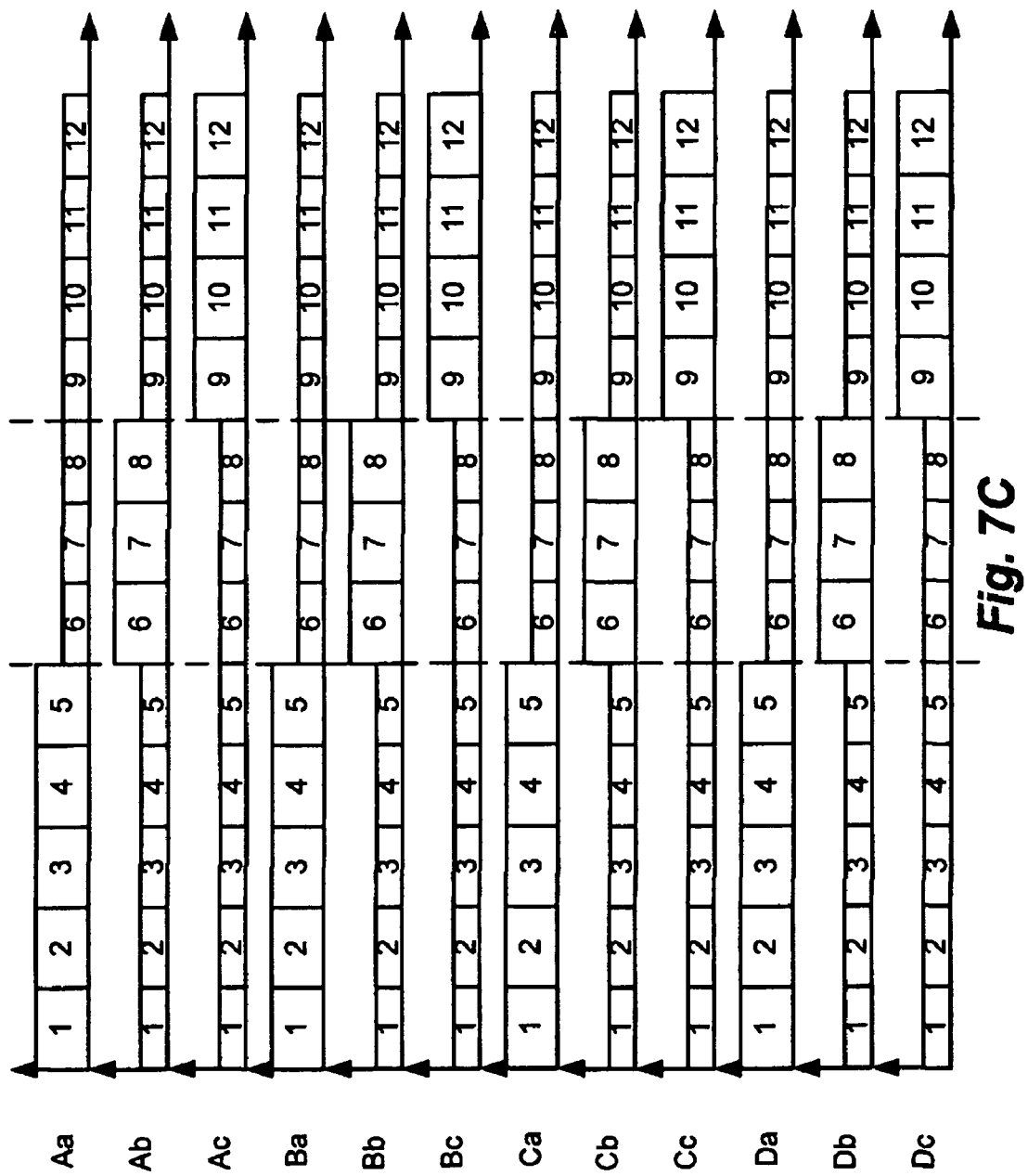

FIGS. 7A-7C show the allocations of hard FFR, soft FFR A, and soft FFR B to extend the width of the center sub-band.

Figure 8:
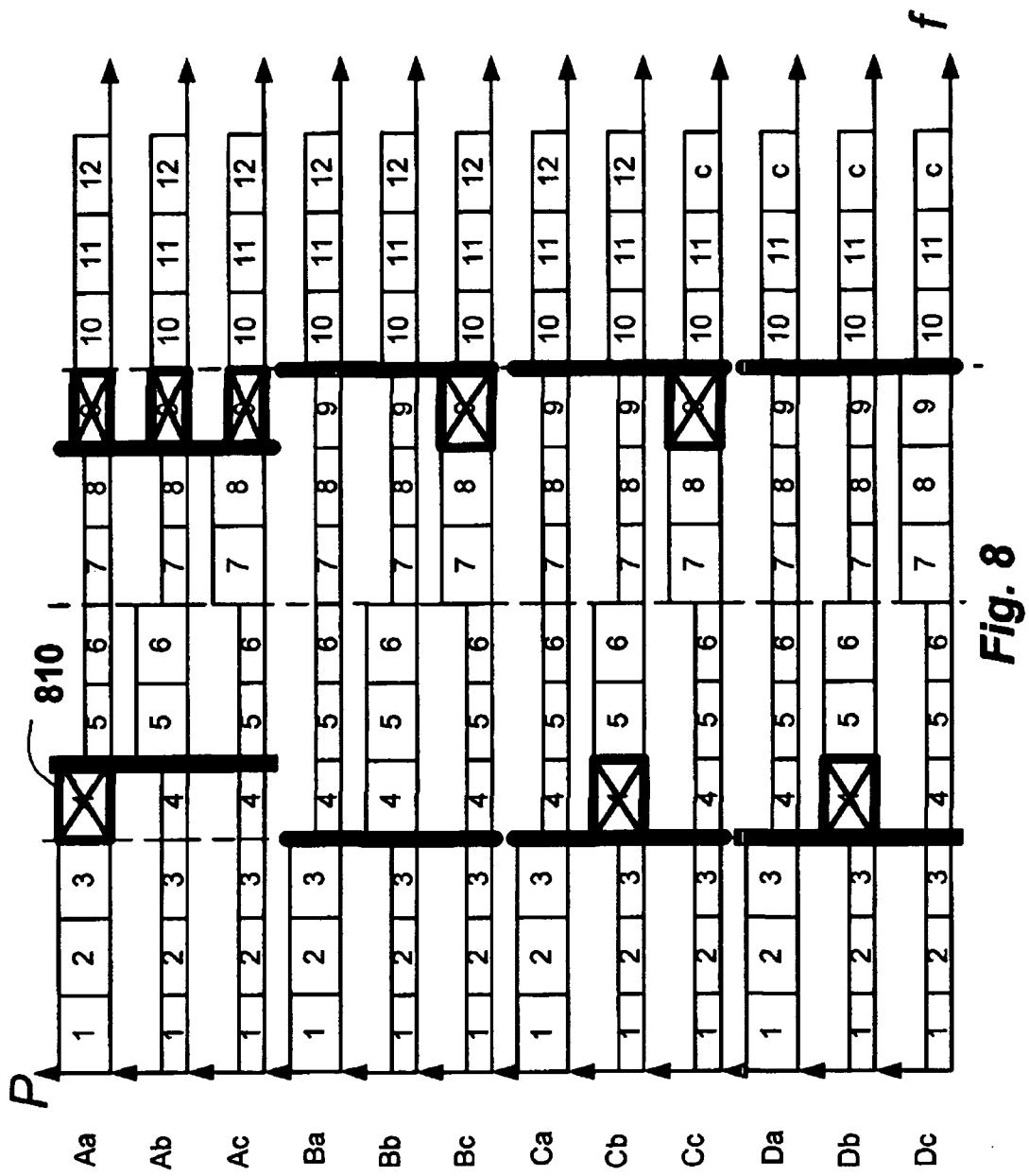
FIG. 8 is a schematic of an interference problem of the adjustment without allocation coordination.

FIG. 8 shows the allocation of a cluster adaptive to traffic loads but without coordinating with other clusters. This allocation is less than optimum because interference can increase as shown in FIG. 8 denoted by crossed blocks 800.

We solve this problem while increasing network throughput. We can also individually adapt portions of edge sub-bands and center sub-bands dependent on the network topology. For example, the sub-channel for the Aa edge zone needs to be increased while the sub-channel for the Ab edge sub-band needs to be reduced. In this case, the sub-channel for cell Ac is reduced to provide an increased center sub-band. This information is used to reconstruct the corresponding node weighted constraint graph.

Construction of Node Weighted Constraint Graph

Figure 9:
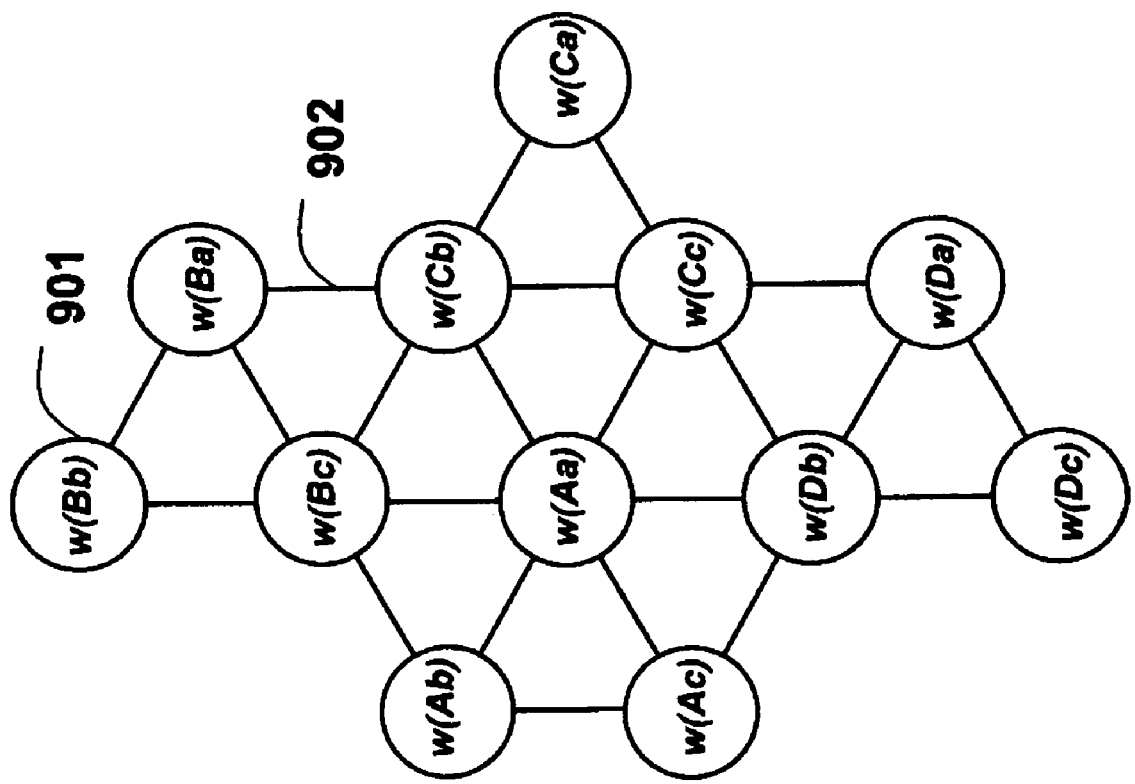
FIG. 9 is a node weighted constraint graph of the multi-cell network of FIG. 4 according to the embodiments of the invention.

FIG. 9 shows the node weighted constraint graph for the network of FIG. 4. The construction 110 considers the locations of the base stations (network topology 50), their constraints, and traffic load 102. Each base station is represented by a node 901 in the graph. An edge 902 connects adjacent nodes (BSs), which are likely to interfere on their downlinks. The weight (w) corresponds to the traffic load.

Resource Allocation and Reservation

First, sub-channels are allocated for the cell edge zones in the network. The maximal independent set in the graph are iteratively searched, and sub-channels are allocated to the BSs for the corresponding nodes until all sub-channels are allocated or the edge resource requirements are satisfied. In each iteration, the method searches the maximal independent set in the node weighted constraint graph. An unallocated sub-channel is used for the allocation to the nodes in the set.

Then, the node weighted constraint graph is updated for next iteration. The weights of the nodes in the set are reduced because these nodes will obtain the resources for the edge traffic loads. For each node in the set, if the node weight is non-positive and the allocated resource is above the edge sub-band lower bound, the node and corresponding edge(s) is removed from the node weighted constraint graph. In the case that the node reaches the maximum allowed resource, the node and corresponding edge(s) are also removed.

The iteration terminates until the node weighted constraint graph is empty or all sub-channels are allocated. The center sub-band of each base station is determined by the complementary set of all sub-channels allocated to the edge sub-band, i.e., unallocated sub-channels.

Transmit Power Assignment

After the resource allocation, as defined herein, sub-channel "stealing" uses sub-channel residual capacity (unallocated sub-channels) of an adjacent edge zone by increasing the transmit power for the center zone from $P_{c2}$ to $P_{c1}$, where $P_{c1}$ is greater than $P_{c2}$. By increasing the transmit power, the traffic load in the center zone can be increased, without increasing interference in the adjacent edge zone, because the "stolen" sub-channels there are unallocated.

Figure 10:
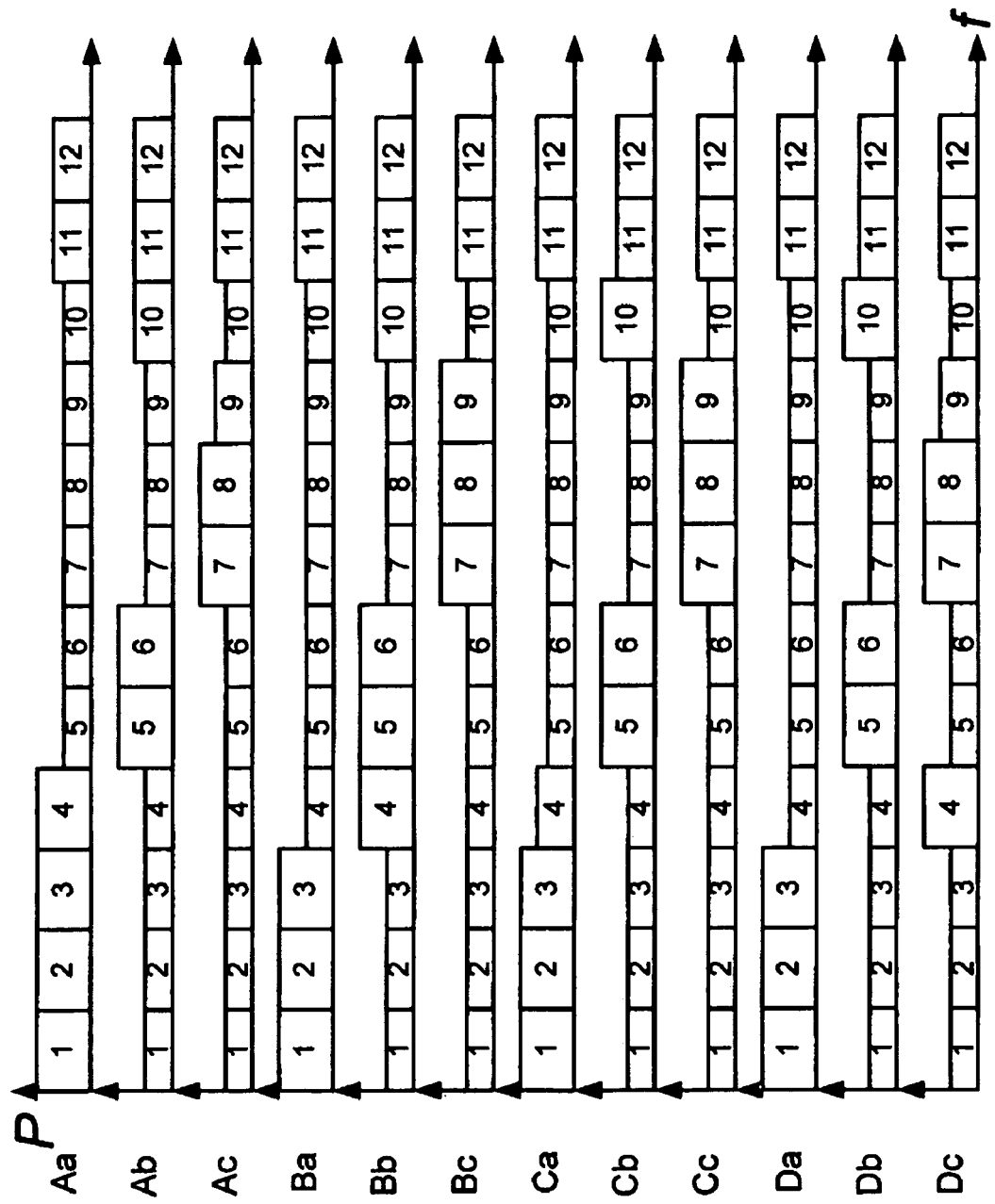
FIG. 10 is a schematic of sub-channel allocation and transmit power assignment according to the embodiments of the invention.

FIG. 10 shows an example sub-channel allocation and power assignment according to the embodiments of the invention with sub-carrier stealing. As sub-channels are stolen, the sub-channels of other cells are adjusted to reduce interference.

This allocation does not adhere to the fixed alignment of the allocated channels in the conventional hard FFR, soft FFR A and soft FFR B. We enable each cell to adapt the edge sub-band allocation according to its requirement and provide the power assignment to use residual capacity of the sub-channels while interference is reduced. A cell can utilize all sub-channels and reduce interference by allocating the appropriate sub-channels to the edge zones and assigning the transmit power accordingly.

Detailed steps of the sub-channel allocation and power assignment are given in the Appendices.

It is to be understood that various other applications and modifications can be made within the spirit and scope of the invention. Therefore, it is the object of the appended claims to cover all such variations and modifications as come within the true spirit and scope of the invention.

We claim:

1. A method for allocating a bandwidth in an orthogonal frequency-division multiple access network of cells, including a set of base stations and a set of mobile stations for each base station, comprising:

partitioning each cell into a center zone and an edge zone;

constructing a graph of nodes and edges, wherein each node represents one of the base stations, and each edge connects two node representing two adjacent base stations;

associating a weight with each node, wherein the weight corresponds to a traffic load in the cell, such that the graph is a node weighted constraint graph for modeling a topology and traffic load of the network;

allocating sub-channels of the bandwidth for the edge zone of each cell by searching iteratively maximal independent sets of nodes in the graph;

allocating remaining sub-channels of the bandwidth for the center zone of each cell; and assigning a transmit power level to each sub-channel, and wherein the sub-bands of adjacent edge zones are disjoint, and the transmit power assigned to the sub-bands in the edge zones higher than the transmit power assigned to the center zones, and some of the sub-channels remain unallocated to satisfy constraints of allocating the sub-channels for the edge zones.

2. The method of claim 1, wherein the sub-channels allocated for the edge zones and the center zones vary for different cells, while minimizing inter-cell interference.

3. The method of claim 1, wherein the transmit power assigned to the sub-channels vary for different cells, while minimizing inter-cell interference.

4. The method of claim 1, wherein the sub-channels allocated for the edge zone is adapted to a traffic load in the edge zone.

5. The method of claim 1, wherein a sub-band for the edge zone has a lower bound and an upper bound.

6. The method of claim 1, further comprising:

updating the graph dynamically over time to adapt to a varying traffic load and a varying network topology.

7. The method of claim 1, in which a particular maximal independent set is a subset of all nodes in the graph such that no two nodes in the subset are adjacent in the graph, and the particular maximal independent set is not a subset of any other maximal independent set.

8. The method of claim 5, wherein the searching further comprises:

removing the nodes with non-positive weights from the graph if an amount of the allocated sub-channels is greater than the lower bound;

removing the nodes with positive weights from the graph if the amount of the allocated sub-channels is greater than the upper bound; and removing edges connected to the removed nodes.

9. The method of claim 1, wherein the transmit power assigned for a particular sub-channels of the center zone is $P_{c1}$ if the particular sub-channel is not allocated to an adjacent edge zone, and otherwise the transmit power is $P_{c2}$, where $P_{c1}$, is greater than $P_{c2}$.

10. The method of claim 1, wherein the unallocated channels are allocated for the center zone at a lower transmit power than the transmit power assigned to the sub-channels for the edge zone.

11. The method of claim 1, wherein sub-bands for the center zones are unallocated, and available for allocation to the edge zones at a lower power level than when the sub-channels of the sub-band of the center zone are allocated for the center zone.

12. The method of claim 5, wherein the lower bound and the upper bound of the cells can vary independently according to the traffic load.

13. The method of claim 1, wherein the cell is partitioned into a set of sectors, and each sector is partitioned into the center zone and the edge zone.

14. The method of claim 13, wherein each node represents one of the sectors, and each edge connects two node representing two adjacent sectors, and the weight corresponds to the traffic loads in the sector.

* * * * *